United States Patent
Yokoe et al.

(10) Patent No.: US 9,746,087 B2
(45) Date of Patent: Aug. 29, 2017

(54) REFRIGERANT VALVE DEVICE

(71) Applicant: NIDEC SANKYO CORPORATION, Suwa-gun, Nagano (JP)

(72) Inventors: Satoru Yokoe, Nagano (JP); Tetsuhiko Hara, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 164 days.

(21) Appl. No.: 14/433,781

(22) PCT Filed: Nov. 26, 2013

(86) PCT No.: PCT/JP2013/081772
§ 371 (c)(1),
(2) Date: Apr. 6, 2015

(87) PCT Pub. No.: WO2014/081037
PCT Pub. Date: May 30, 2014

(65) Prior Publication Data
US 2015/0276070 A1    Oct. 1, 2015

(30) Foreign Application Priority Data
Nov. 26, 2012    (JP) .................................. 2012-257904

(51) Int. Cl.
*F16K 3/08*    (2006.01)
*F16K 31/53*    (2006.01)
(Continued)

(52) U.S. Cl.
CPC ................ *F16K 3/085* (2013.01); *F16K 3/08* (2013.01); *F16K 31/041* (2013.01); *F16K 31/535* (2013.01); *F25B 41/04* (2013.01)

(58) Field of Classification Search
CPC . F25B 41/04; F16K 3/085; F16K 3/08; F16K 31/041; F16K 31/535
See application file for complete search history.

(56) References Cited

U.S. PATENT DOCUMENTS 4,139,355 A * 2/1979 Turner ................ F16K 11/0743
137/625.43
4,156,437 A * 5/1979 Chivens .............. F16K 11/0743
137/554
(Continued)

FOREIGN PATENT DOCUMENTS

JP    2000346227 A    12/2000
JP    2002318036 A    10/2002
(Continued)

OTHER PUBLICATIONS

International Search Report corresponding to Application No. PCT/JP2013/081772; Date of Mailing: Dec. 24, 2013, with English translation.

*Primary Examiner* — Eric Keasel
(74) *Attorney, Agent, or Firm* — Cantor Colburn LLP

(57) ABSTRACT

A refrigerant valve device may include a base provided with an inlet port, an outlet port and a valve seat face; a cover to section a valve chamber between the valve seat face and the cover; a valve body turnably disposed at a position shifted to a side of one port inside the valve chamber, the valve body being provided with a contact face sliding on the valve seat face; and a valve body drive mechanism to turn the valve body. The valve body drive mechanism may turn the valve body and thereby a refrigerant flowing passage from the inlet port to the outlet port through the valve chamber is switched at least to a first refrigerant flowing passage and to a second refrigerant flowing passage. The refrigerant flowing amount in the first refrigerant flowing passage may be smaller than a refrigerant flowing amount in the second refrigerant flowing passage.

21 Claims, 11 Drawing Sheets

(51) Int. Cl.
    *F16K 31/04*     (2006.01)
    *F25B 41/04*     (2006.01)

(56) References Cited

U.S. PATENT DOCUMENTS

| | | | | |
|---|---|---|---|---|
| 6,591,619 | B2* | 7/2003 | Kaneko | F16K 11/074 |
| | | | | 137/625.31 |
| 6,880,802 | B2* | 4/2005 | Hara | F16K 3/08 |
| | | | | 137/315.17 |
| 6,926,250 | B1* | 8/2005 | Hashimoto | F16K 11/074 |
| | | | | 251/129.11 |
| 7,316,384 | B2* | 1/2008 | Sekiya | F16K 11/0743 |
| | | | | 251/129.11 |
| 7,437,888 | B2* | 10/2008 | Son | F16K 11/074 |
| | | | | 62/527 |
| 7,628,170 | B2* | 12/2009 | Kok-Hiong | F16K 3/08 |
| | | | | 137/601.14 |
| 7,775,239 | B2* | 8/2010 | Jeong | F16K 11/074 |
| | | | | 137/625.21 |
| 8,074,678 | B2* | 12/2011 | Kee | F16K 3/08 |
| | | | | 137/493.8 |
| 8,424,318 | B2* | 4/2013 | Li | F25B 41/062 |
| | | | | 62/190 |
| 2012/0037828 | A1* | 2/2012 | Reeb | F16K 3/085 |
| | | | | 251/321 |
| 2012/0047914 | A1* | 3/2012 | Li | F25B 41/062 |
| | | | | 62/56 |

FOREIGN PATENT DOCUMENTS

| | | |
|---|---|---|
| JP | 2003021254 A | 1/2003 |
| JP | 2004156771 A | 6/2004 |
| JP | 2007144468 A | 6/2007 |

\* cited by examiner

REFRIGERANT VALVE DEVICE

CROSS REFERENCE TO PRIOR APPLICATIONS

This is the U.S. national stage of application No. PCT/JP2013/081772, filed on Nov. 26, 2013. Priority under 35 U.S.C. §119(a) and 35 U.S.C. §365(b) is claimed from Japanese Application No. 2012-257904, filed Nov. 26, 2012, the disclosures of which are incorporated herein by reference.

DESCRIPTION

Field of the Invention

The present invention relates to a refrigerant valve device for regulating a flow amount of refrigerant.

Background

A refrigerant valve device for regulating a supply amount of refrigerant which is used to cool an inside of a refrigerator is described in Patent Literature 1. A refrigerant valve device described in Patent Literature 1 includes a base having a refrigerant inlet port and a valve seat face where two refrigerant outlet ports are opened, a cover which is fitted to the base and covers the refrigerant inlet and the valve seat face, a valve body which is disposed so as to superpose on the valve seat face, and a valve body drive mechanism configured to turn the valve body around an axial line perpendicular to the valve seat face. In the refrigerant valve device structured as described above, when the valve body drive mechanism turns the valve body around the axial line, two refrigerant outlet ports are changed to a state that both of the outlet ports are closed, a state that both of the outlet ports are opened, a state that one is opened and the other is closed, and a state that the one is closed and the other is opened.

PATENT LITERATURE

[PTL 1] Japanese Patent Laid-Open No. 2007-144468

In the refrigerant valve device described in Patent Literature 1, one refrigerant outlet port is switched only to an open state and a closed state and thus a flow amount of fluid cannot be changed. Therefore, in order to change a flow amount of refrigerant passing through the refrigerant valve device, two refrigerant outlet ports are provided and switched to a state that refrigerant is supplied through only one refrigerant outlet port and to a state that the refrigerant is supplied through the two refrigerant outlet ports. Accordingly, in the refrigerant valve device described in Patent Literature 1, two outflow pipes are required to connect a side to which refrigerant is supplied from the refrigerant valve device with the refrigerant valve device and thus the structure becomes complicated.

In view of the problems described above, at least an embodiment of the present invention provides a refrigerant valve device which is capable of changing a flow amount of refrigerant in one refrigerant outlet port.

SUMMARY

To achieve the above, at least an embodiment of the present invention provides a refrigerant valve device including a base which is provided with a refrigerant inlet port, a refrigerant outlet port and a valve seat face on which at least one of the refrigerant inlet port and the refrigerant outlet port is opened, a cover configured to section a valve chamber communicating with the refrigerant inlet port and the refrigerant outlet port between the valve seat face and the cover, a valve body which is turnably disposed at a position as a turning center shifted to a side of one port of the refrigerant inlet port and the refrigerant outlet port in an inside of the valve chamber, the valve body being provided with a contact face sliding on the valve seat face, and a valve body drive mechanism structured to turn the valve body around an axial line which passes the turning center and is perpendicular to the valve seat face. The valve body drive mechanism turns the valve body and thereby a refrigerant flowing passage from the refrigerant inlet port to the refrigerant outlet port through the valve chamber is switched at least to a first refrigerant flowing passage and to a second refrigerant flowing passage, and a refrigerant flowing amount in the first refrigerant flowing passage is smaller than a refrigerant flowing amount in the second refrigerant flowing passage.

According to at least an embodiment of the present invention, the valve body is turned by the valve body drive mechanism and thereby the refrigerant flowing passage from the refrigerant inlet port to the refrigerant outlet port through the valve chamber can be switched at least to a first refrigerant flowing passage whose flowing amount is small and to a second refrigerant flowing passage whose flowing amount is large. Therefore, a flow amount of the refrigerant can be changed in one refrigerant outlet port. Further, the valve body is turned at a position as a turning center shifted to a side of one port of the refrigerant inlet port and the refrigerant outlet port and thus the size of the valve body can be reduced.

In at least an embodiment of the present invention, it is preferable that the other port of the refrigerant inlet port and the refrigerant outlet port is set in a fully opened state even when the refrigerant flowing passage is switched to either of the first refrigerant flowing passage and the second refrigerant flowing passage, and that the valve body drive mechanism turns the valve body so that a refrigerant flowing passage between the valve chamber and the one port is switched to the first refrigerant flowing passage and the second refrigerant flowing passage. According to this structure, an opening degree of the other port is not required to be changed by the valve body and thus the structure can be simplified.

In at least an embodiment of the present invention, it is preferable that the one port is the refrigerant outlet port and the other port is the refrigerant inlet port. According to this structure, pressure of the refrigerant acts as a force for pressing the valve body against the valve seat face and thus unnecessary leakage of the refrigerant is hard to be occurred between the valve body and the valve seat face.

In at least an embodiment of the present invention, it is preferable that the valve body is formed with an orifice which penetrates through the valve body and whose one end is opened on a contact face side, and that the valve body drive mechanism switches the refrigerant flowing passage to at least the first refrigerant flowing passage through the orifice and the second refrigerant flowing passage which is not passed through the orifice. According to this structure, a flowing amount of the first refrigerant flowing passage can be set in an appropriate level by an inner diameter of the orifice.

In this case, it may be structured that the orifice is provided at plurality of positions of the valve body.

In at least an embodiment of the present invention, it may be structured that the valve body is formed with a cut-out portion for communicating the one port with the valve chamber when the refrigerant flowing passage is set in the second refrigerant flowing passage.

In this case, it is preferable that the cut-out portion divides the contact face into a plurality of portions in a circumferential direction on a moving trace of the one port on the valve body when the valve body is turned, and that a width dimension in the circumferential direction of the contact face on a turning trace is narrower than an opening width in the circumferential direction of the one port. According to this structure, the refrigerant outlet port is not set in a complete closed state and thus, the valve body is avoided from becoming hard to move by pressure of the refrigerant. In other words, if the refrigerant outlet port is completely closed, the valve body is set in a pressed state against the valve seat face by pressure of the refrigerant flowing into the valve chamber from the refrigerant inlet port and thus a large force is required as a drive force for driving the valve body. As a result, a large drive force is required in a drive source for driving the valve body. However, according to at least an embodiment of the present invention, this problem is avoided.

In at least an embodiment of the present invention, it is preferable that the contact face is formed with a recessed part and one end of the orifice is opened at a bottom part of the recessed part. According to this structure, even when the contact face is polished, a situation that an opening of one end of the orifice becomes small or is closed by a burr occurred by polishing or deformation can be avoided.

In at least an embodiment of the present invention, it is preferable that the contact face is formed with a recessed part, one end of the orifice is opened at a bottom part of the recessed part, and a width dimension on the turning trace in the circumferential direction of the contact face between the recessed part and the cut-out portion in the circumferential direction is narrower than the opening width in the circumferential direction of the one port. According to this structure, the refrigerant outlet port does not become a complete closed state and thus the valve body is avoided from being hard to move by pressure of the refrigerant. In other words, if the refrigerant outlet port is completely closed, the valve body is set in a pressed state against the valve seat face by pressure of the refrigerant flowing into the valve chamber from the refrigerant inlet port and thus a large force is required as a drive force for driving the valve body. As a result, a large drive force is required in a drive source for driving the valve body. However, according to at least an embodiment of the present invention, this problem can be avoided.

In at least an embodiment of the present invention, it is preferable that the drive mechanism includes a drive source and a gear train which transmits a drive force of the drive source to the valve body, and that a final gear of the gear train is overlapped with the valve body on an opposite side to the contact face side of the valve body in an extended direction of the axial line and is connected with the valve body. According to this structure, a structure surrounding the valve body can be simplified and thus the size of the refrigerant valve device can be reduced.

In this case, it is preferable that a connected portion of the final gear with the valve body is provided at plural positions.

Further, it is preferable that the connected portions of the final gear with the valve body are provided at unequal intervals in the circumferential direction.

In at least an embodiment of the present invention, it is preferable that the other end of the orifice is opened at a position of the valve body overlapping with the final gear and a communicating path for communicating the other end of the orifice with the valve chamber is formed on at least one of a face of the final gear overlapping with the valve body and a face of the valve body overlapping with the final gear. According to this structure, even when the valve body and the final gear are overlapped with each other, the orifice and the valve chamber are communicated with each other.

In this case, it may be structured that, for example, the communicating path is a cut-out portion which is formed on the face of the valve body overlapping with the final gear. According to this structure, the output gear and the valve body drive mechanism are not required to be enlarged in order to provide a communicating path in the final gear. In other words, in a structure that a cut-out portion is provided on a portion on the valve body side of the final gear from an outer peripheral side, a teeth part of the final gear is required to provide at a position separated from the valve body in the turning center line direction by an amount for providing the cut-out portion. Further, a gear and the like of a preceding stage of the reduction gear train which is engaged with the final gear are required to dispose at separated positions from the valve body in the turning center line direction and therefore, the valve body drive mechanism may be enlarged in the turning center line direction. Further, a diameter of the final gear which is attached to the valve body is not required to reduce and thus a motor whose drive force is small can be used as a drive source and turning of the valve body can be controlled with a high degree of accuracy. Therefore, it is preferable that the communicating path is a cut-out portion which is formed on the face of the valve body overlapping with the final gear.

In at least an embodiment of the present invention, it may be structured that the other end of the orifice is opened at a position of the valve body overlapping with the final gear and the final gear is formed with a communicating path for communicating the other end of the orifice with the valve chamber. According to this structure, even when the valve body and the final gear are overlapped with each other, the orifice and the valve chamber are communicated with each other.

In at least an embodiment of the present invention, it may be structured that the other end of the orifice is opened at a position of the valve body overlapping with the final gear and is communicated with the valve chamber through a gap space formed between the valve body and the final gear. According to this structure, even when the valve body and the final gear are overlapped with each other, the orifice and the valve chamber are communicated with each other.

In at least an embodiment of the present invention, it may be structured that the other end of the orifice is opened at a position of the valve body that is not overlapped with the final gear so as to be in an opened state to the valve chamber. According to this structure, even when the valve body and the final gear are overlapped with each other, the orifice and the valve chamber are communicated with each other.

In at least an embodiment of the present invention, a structure described below may be adopted even when the orifice is not formed in the valve body.

In at least an embodiment of the present invention, it may be structured that the valve body is formed with a plurality of cut-out portions for connecting the one port with the valve chamber.

In this case, it is preferable that the cut-out portions divide the contact face into a plurality of portions in a circumferential direction on a moving trace of the one port on the valve body when the valve body is turned, and that a width dimension in the circumferential direction of the contact face on a turning trace is narrower than an opening width in the circumferential direction of the one port.

In at least an embodiment of the present invention, it is preferable that the drive mechanism includes a drive source and a gear train which transmits a drive force of the drive source to the valve body, and that a final gear of the gear train is overlapped with the valve body on an opposite side to the contact face side of the valve body in an extended direction of the axial line and is connected with the valve body. According to this structure, a structure surrounding the valve body can be simplified and thus the size of the refrigerant valve device can be reduced.

In this case, it is preferable that a connected portion of the final gear with the valve body is provided at plural positions.

In at least an embodiment of the present invention, it is preferable that at least one of the contact face and the valve seat face is polished. According to this structure, the valve body slides smoothly on the valve seat face. Further, unnecessary leakage of refrigerant can be avoided between the valve body and the valve seat face.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

A refrigerant valve device for a refrigerator to which at least an embodiment of the present invention is applied will be described below with reference to the accompanying drawings.

(Entire Structure)

Figure 1:
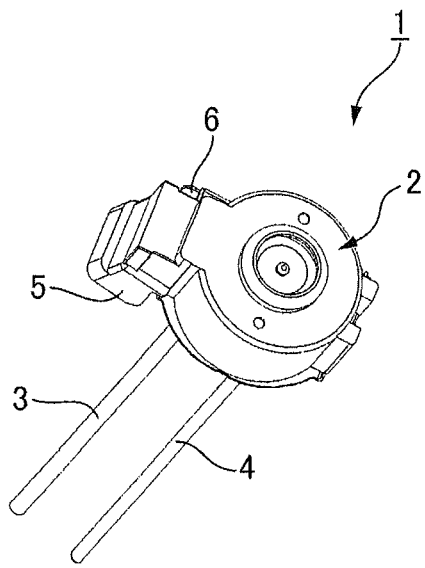
FIGS. 1A and 1B are perspective views showing a refrigerant valve device for a refrigerator to which at least an embodiment of the present invention is applied.
Figure 1:
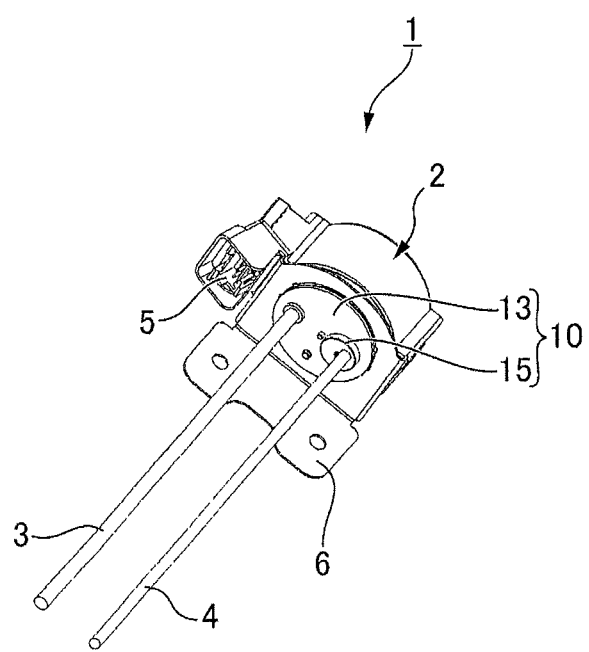
Figure 2:
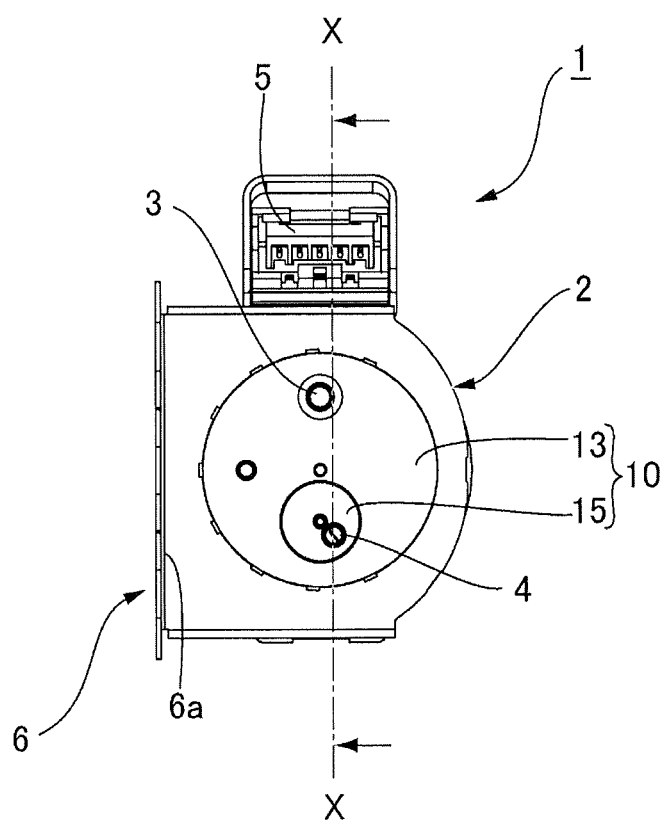
FIG. 2 is a view showing a refrigerant valve device in FIGS. 1A and 1B viewed from a side of an inflow pipe and an outflow pipe.

FIGS. 1A and 1B are perspective views showing a refrigerant valve device for a refrigerator to which at least an embodiment of the present invention is applied. FIG. 1A is a view showing the refrigerant valve device which is viewed from a valve main body side and FIG. 1B is a view showing the refrigerant valve device which is viewed from a side where an inflow pipe and an outflow pipe are protruded. FIG. 2 is a view showing the refrigerant valve device which is viewed from a side of the inflow pipe and the outflow pipe. The refrigerant valve device 1 is mounted on a refrigerator to regulate a supply amount of refrigerant for cooling an inside of the refrigerator. As shown in FIGS. 1A and 1B, the refrigerant valve device 1 includes a valve main body 2 and an inflow pipe 3 and an outflow pipe 4 which are extended in parallel with each other from the valve main body 2. The valve main body 2 includes a connector 5 for securing an electric connection with an external control device and an attaching plate 6 for attaching the refrigerant valve device 1 to an inside of the refrigerator. In the following descriptions, for convenience, extending directions of the inflow pipe 3 and the outflow pipe 4 are referred to as an upper and lower direction, the valve main body 2 is disposed on an upper side and the inflow pipe 3 and the outflow pipe 4 are disposed on a lower side.

Figure 3:
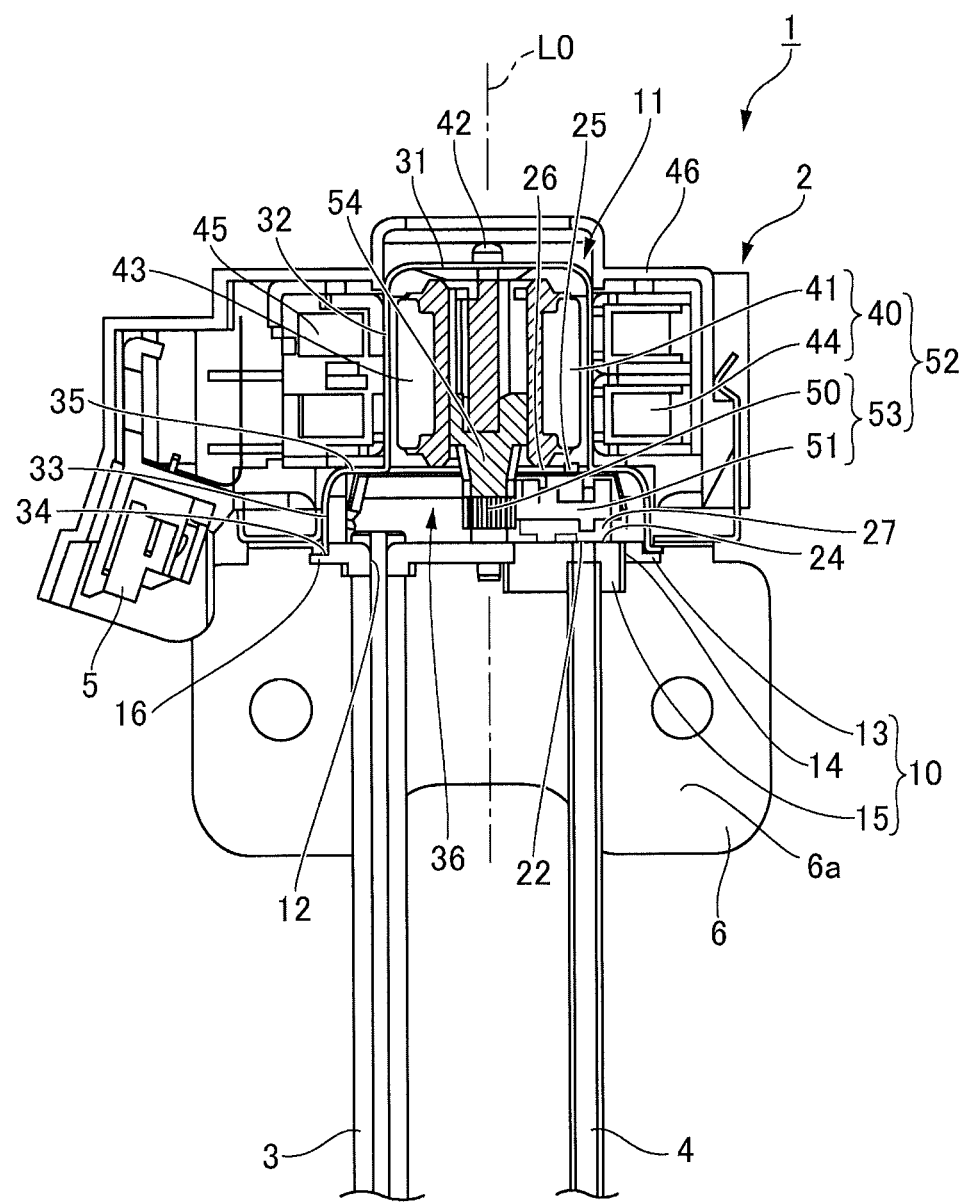
FIG. 3 is a longitudinal sectional view showing the refrigerant valve device in FIGS. 1A and 1B.
Figure 4:
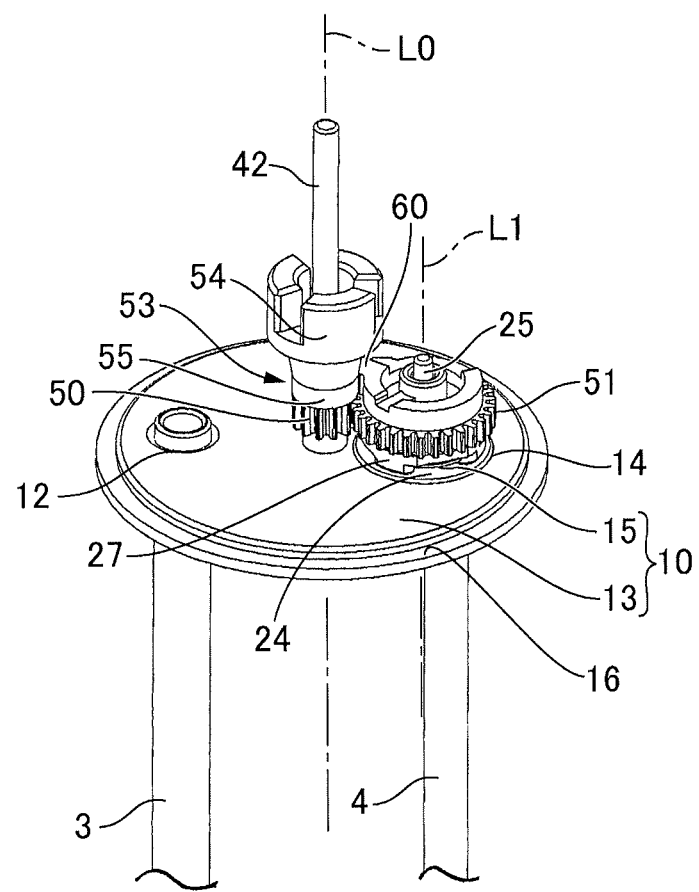
FIG. 4 is a perspective view showing a base, a rotor support shaft, a reduction gear train, a valve body and a support shaft.
Figure 5:
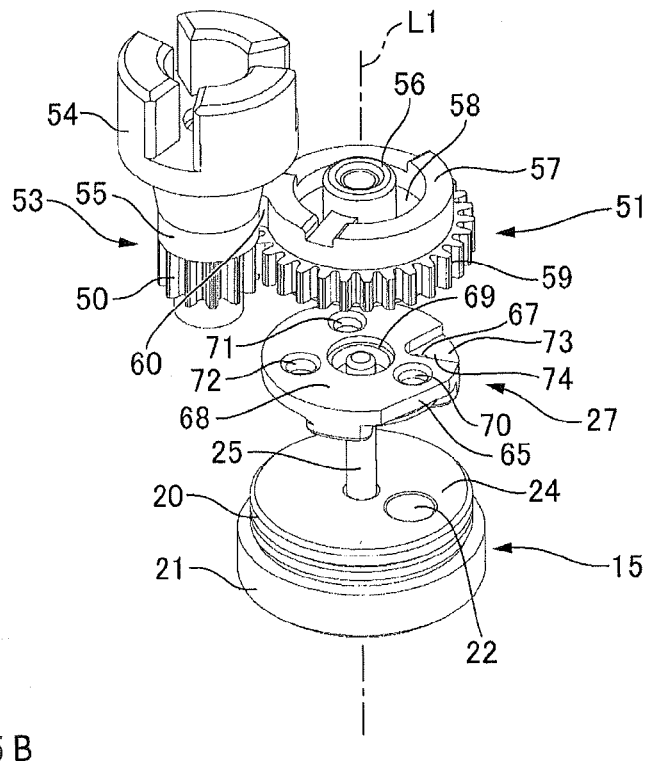
FIGS. 5A and 5B are exploded perspective views showing a reduction gear train, a valve body and a valve seat constituting member.
Figure 5:
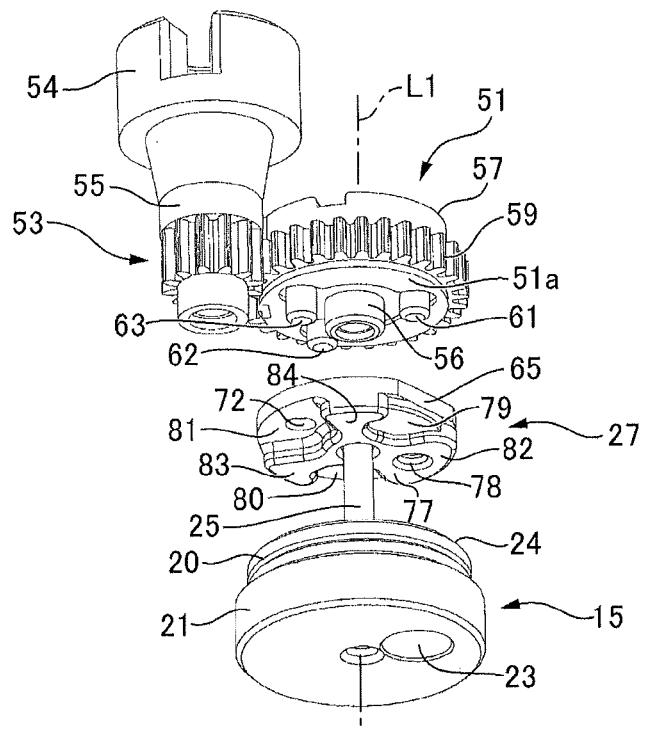

FIG. 3 is a sectional view showing the refrigerant valve device 1 which is cut by the "X-X" line in FIG. 2. The "X-X" line is extended so as to pass the center of the outflow pipe 4 and in parallel with a plate-shaped portion 6a of the attaching plate 6. FIG. 4 is a perspective view showing a base, a rotor support shaft, a reduction gear train, a valve body and a support shaft. FIGS. 5A and 5B are exploded perspective views showing a reduction gear train, a valve body and a valve seat constituting member. FIG. 5A is an exploded perspective view showing a reduction gear train, a valve body, a support shaft and a valve seat constituting member which are viewed from an upper side and FIG. 5B is an exploded perspective view showing them viewed from a lower side.

As shown in FIG. 3, the valve main body 2 includes a base 10 having a disk shape and a cup-shaped sealing cover 11 whose opening is directed toward a lower side for covering the base 10 from an upper side. As shown in FIG. 4, the base 10 includes a base main body 13 which is formed with a refrigerant inlet 12 and a valve seat constituting member 15 in a disk shape which is attached to an attaching hole 14 of the base main body 13. The refrigerant inlet 12 and the valve seat constituting member 15 are located on opposite sides to each other with a center axial line "L0" of the base 10 interposing therebetween. A ring-shaped base side flange 16 is formed at a lower end of the base 10 so as to enlarge from its outer circumferential edge to an outer peripheral side. An inflow pipe 3 is connected with the refrigerant inlet port 12 and an upper end of the inflow pipe 3 is protruded to an upper side from the base 10.

As shown in FIGS. 5A and 5B, the valve seat constituting member 15 whose planar shape viewed in the center axial line "L0" direction of the base 10 is circular is provided with a disk-shaped small diameter part 20 and a disk-shaped disk part 21 whose diameter is larger than the small diameter part 20 from an upper side to a lower side. The valve seat constituting member 15 is, as shown in FIG. 1B and FIG. 3, fixed to the base main body 13 in a state that the small diameter part 20 is attached to the attaching hole 14 in a circular shape from a lower side of the base 10. A refrigerant outlet port 22 is formed at a position separated from a center axial line of the valve seat constituting member 15. In a state that the valve seat constituting member 15 has been attached to the attaching hole 14 of the base main body 13, the refrigerant outlet port 22 is disposed at a position separated in a circumferential direction from a straight line which is formed by connecting the refrigerant inlet port 12 with the center axial line "L0" of the base 10.

The outflow pipe 4 is communicated with the refrigerant outlet port 22. More specifically, as shown in FIG. 3, the refrigerant outlet port 22 is formed as an upper end opening of a stepped hole 23 which is formed in the valve seat constituting member 15. The outflow pipe 4 is inserted to a step part of the stepped hole 23 from a lower side of the base 10 and thereby the outflow pipe 4 is fixed to the valve seat constituting member 15 and is communicated with the refrigerant outlet port 22. An upper face of the valve seat constituting member 15 is formed to be a flat valve seat face 24.

A support shaft 25 is attached at a center of the valve seat constituting member 15 so as to be perpendicular to the valve seat face 24. An upper end of the support shaft 25 is, as shown in FIG. 3, supported by a support plate 26 which is disposed in an inside of a valve chamber 36. Further, an axial line "L1" of the support shaft 25 and the center axial line of the valve seat constituting member 15 are coincided with each other. A disk-shaped valve body 27 is rotatably supported by the support shaft 25. The valve body 27 is placed on the valve seat face 24 in a rotatable state around the support shaft 25 (axial line "L1").

The sealing cover 11 is formed by pressing a plate member made of nonmagnetic stainless steel. As shown in FIG. 3, the sealing cover 11 is, from an upper side to a lower side, provided with a circular bottom part 31, a small diameter tube part 32 which is extended from an outer circumferential edge of the bottom part 31 to a lower side, a large diameter tube part 33 having a diameter larger than the small diameter tube part 32, and a case side flange 34 which is enlarged from a lower end edge (opening edge) of the large diameter tube part 33 toward an outer peripheral side. A ring-shaped part 35 which is extended in a direction intersecting the center axial line "L0" of the base 10 is provided between the small diameter tube part 32 and the large diameter tube part 33 so as to connect the small diameter tube part 32 with the large diameter tube part 33. The sealing cover 11 is fixed to the base 10 in a state that an upper side portion of the base main body 13 is inserted into an inner side of a lower end opening edge of the large diameter tube part 33 and the case side flange 34 is abutted with the base side flange 16 from an upper side. The sealing cover 11 is placed to cover the base 10 so as to cover the refrigerant inlet port 12, the valve seat face 24 and the valve body 27 placed on the valve seat face 24 and thereby the sealing cover 11 sections and structures a valve chamber 36 having the refrigerant inlet port and the refrigerant outlet port 22 together with the base 10.

The valve main body 2 is structured with a stepping motor 40 as a drive source for driving the valve body 27 by utilizing an inside and an outside of the sealing cover 11. As shown in FIG. 3, a rotor 41 of the stepping motor 40 is disposed on an inner side of the sealing cover 11. The rotor 41 is rotatably supported by a rotor support shaft 42. An upper end of the rotor support shaft 42 is fixed to the bottom part 31 of the sealing cover 11 and its lower end is fixed to a center of the base 10. An axial line of the rotor support shaft 42 is coincided with the center axial line "L0" of the base 10 and is extended in parallel with the support shaft 25 which is attached to the valve seat constituting member 15. A ring-shaped drive magnet 43 is mounted on the rotor 41.

A stator 44 of the stepping motor 40 is placed on the ring-shaped part 35 of the sealing cover 11 and is disposed on an outer peripheral side of the sealing cover 11. Drive coils 45 are mounted in the stator 44 and the drive coils 45 face the drive magnet 43 of the rotor 41 through the small diameter tube part 32 of the sealing cover 11. The drive coils 45 are electrically connected with the connector 5 and the stepping motor 40 is driven and controlled by an external control device which is connected through the connector 5. The stator 44 and the connector 5 are accommodated on an inner side of an outer case 46.

Rotation of the rotor 41 is transmitted to the valve body 27 through a pinion 50 and an output gear 51 engaged with the pinion 50. In other words, a valve body drive mechanism 52 is structured of the stepping motor 40, the pinion 50 and the output gear 51. The pinion 50 and the output gear 51 structure a reduction gear train 53 (gear train) and the output gear 51 is a final gear of the reduction gear train 53.

(Reduction Gear Train and Valve Body)

Figure 6:
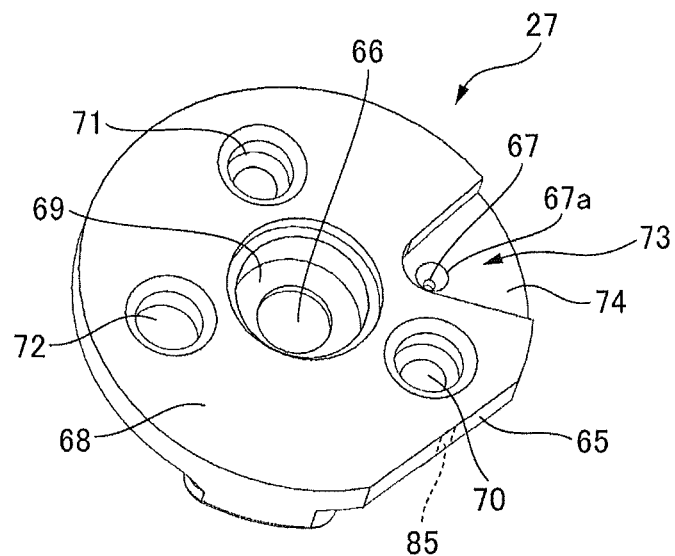
FIGS. 6A and 6B are perspective views showing a valve body.
Figure 6:
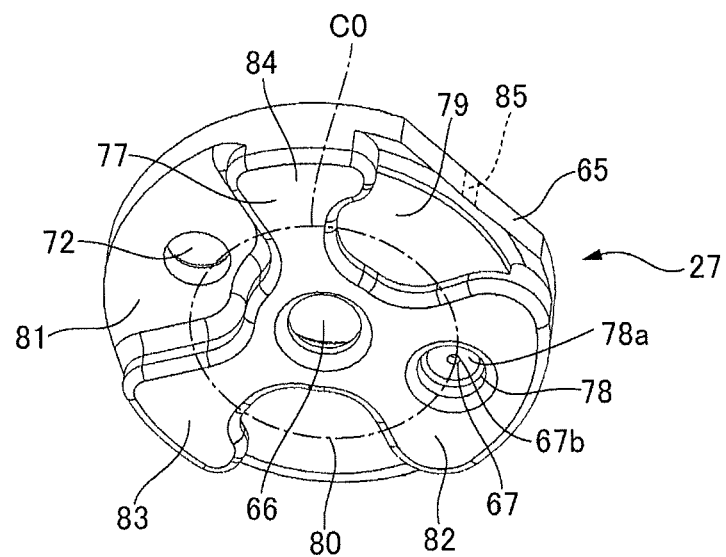
Figure 7:
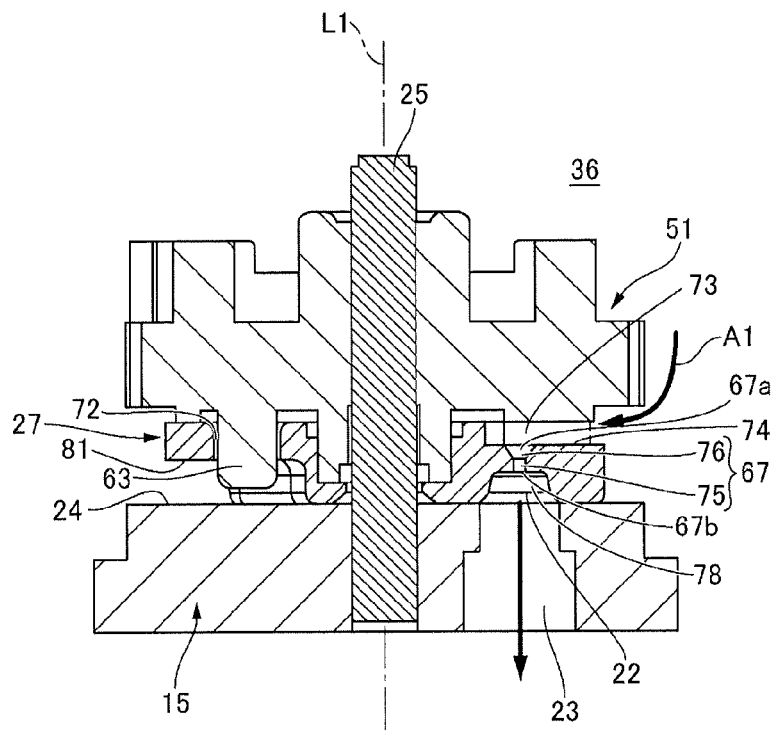
FIG. 7 is a cross-sectional view showing an output gear, a valve body and a valve seat constituting member.
Figure 8:
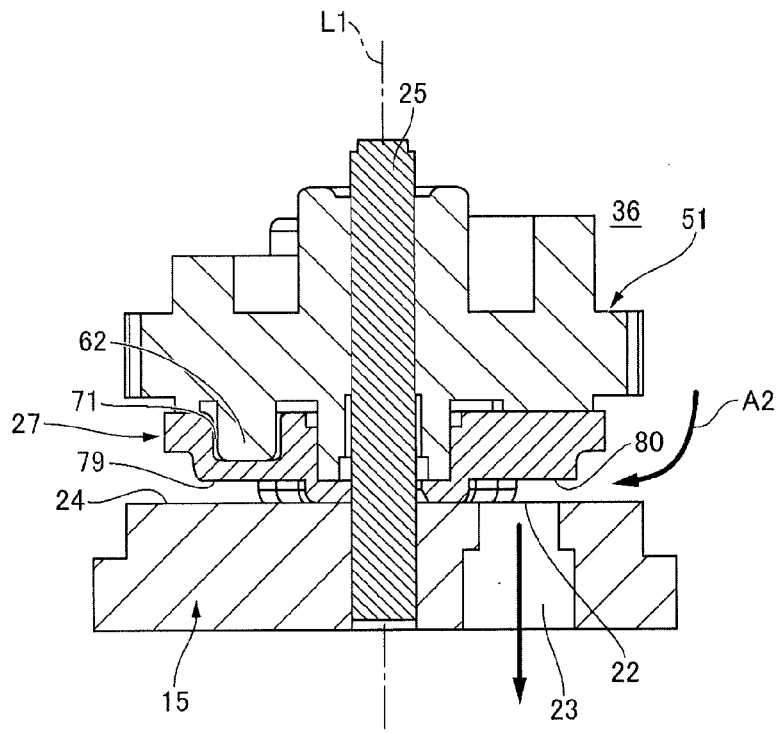
FIG. 8 is a cross-sectional view showing an output gear, a valve body and a valve seat constituting member.

FIGS. 6A and 6B are perspective views showing the valve body 27. FIG. 6A is a perspective view showing the valve body 27 which is viewed from an upper side and FIG. 6B is a perspective view showing the valve body 27 which is viewed from a lower side. FIG. 7 is a longitudinal sectional view showing the output gear 51, the valve body 27 and the valve seat constituting member 15 in a state that an orifice 67 and a recessed part of the valve body 27 described below and the refrigerant outlet port 22 are overlapped with each other in the axial line "L1" direction (state that the valve body 27 is located at an orifice communicating position). FIG. 8 is a longitudinal sectional view showing the output gear 51, the valve body 27 and the valve seat constituting member 15 in a state that a valve seat face side cut-out part 80 of the valve body 27 described below and the refrigerant outlet port 22 are overlapped with each other in the axial line "L1" direction (state that the valve body 27 is located at a first valve seat face side cut-out part communicating position). The reduction gear train 53 and the valve body 27 will be described in detail below with reference to FIG. 3 through FIG. 7.

As shown in FIG. 3, the pinion 50 structuring the reduction gear train 53 is formed in a lower end portion of the pinion constituting member 54 which is engaged with the rotor 41 and is integrally rotated with the rotor 41. As shown in FIGS. 4, 5A and 5B, an abutted part 55 with which an arm part 60 described below of the output gear 51 is capable of abutting is provided at a position adjacent to an upper side of the pinion 50 in the pinion constituting member 54.

The output gear 51 is rotatably supported by the support shaft 25 which is fixed to the valve seat constituting member 15. The support shaft 25 is provided at a position overlapping with the drive magnet 43 of the rotor 41 when viewed in the axial line "L1" direction. The drive magnet 43 and the stator 44 are located on an upper side in the axial line "L1" direction of the output gear 51 through the ring-shaped part 35. The output gear 51 is overlapped with the drive magnet 43 of the rotor 41 and the stator 44 when viewed in the axial line "L1" direction. Further, the output gear 51 is, as shown in FIG. 4, coaxially attached to the valve body 27 in a state that the output gear 51 covers an opposite side of the valve body 27 to the valve seat face 24.

The output gear 51 is, as shown in FIGS. 5A and 5B, provided with a tube-shaped shaft insertion part 56 into which the support shaft 25 is inserted, a ring-shaped wall 57 which is coaxially provided with the shaft insertion part 56 at a position separated in a radial direction from the shaft insertion part 56, and a connecting part 58 which connects the shaft insertion part 56 with a lower side portion of an inner peripheral face of the ring-shaped wall 57.

A lower side portion of an outer peripheral face of the ring-shaped wall 57 is formed with a ring-shaped teeth part 59 engaged with the pinion 50. An upper side portion of an outer peripheral face of the ring-shaped wall 57 is, as shown in FIGS. 4 and 5A, provided with an arm part 60 which is protruded to an outer side in a radial direction from a portion in its circumferential direction. When the output gear 51 is turned to reach to a predetermined angular position, the arm part 60 is abutted with an abutted part 55 of the pinion constituting member 54 from one side or from the other side around the support shaft 25 and thereby a turning angle range of the output gear 51 is restricted. An under face 51a of the output gear 51 is formed with projections 61, 62 and 63 at three positions separated from each other in a circumferential direction. Protruding dimensions of the respective projections 61, 62 and 63 to the valve body 27 side are the same as each other. A lower end portion of the shaft insertion part 56 is protruded to a lower side relative to an under face 51a of the output gear 51.

The valve body 27 is, as shown in FIGS. 6A and 6B, formed in a disk shape as a whole and, when viewed in the axial line "L1" direction of the support shaft 25, the valve body 27 is provided with a cut-off part 65 which is formed by cutting off a part in a circumferential direction of a circle in a straight shape. A shaft insertion hole 66 into which the support shaft 25 is inserted is formed at a center of the valve body 27. A lower end portion of the shaft insertion hole 66 is, as shown in FIG. 6B, formed so that its inner diameter dimension is enlarged toward a lower side. Further, the valve body 27 is provided with an orifice 67 penetrating through the valve body 27 in an upper and lower direction at a position separated in a radial direction from the shaft insertion hole 66. The orifice 67 is provided with a portion whose width is narrower than at least the refrigerant outlet port 22 in a flow passage of refrigerant. More preferably, the orifice 67 is provided with a portion whose width is the narrowest in the flow passage of refrigerant. As shown in FIG. 7, the orifice 67 is extended in parallel with the axial line "L1" of the support shaft 25 and is penetrated through the valve body 27.

The valve body 27 is provided with a flat upper end face 68 which is perpendicular to the axial line "L1" of the support shaft 25. An insertion recessed part 69 into which the shaft insertion part 56 of the output gear 51 is inserted from an upper side is provided at a center of the upper end face 68. An inner diameter dimension of the insertion recessed part 69 is larger than an inner diameter dimension of the shaft insertion hole 66. Therefore, an upper end opening of the shaft insertion hole 66 is formed in a bottom face of the insertion recessed part 69. Further, an upper end face 68 of the valve body 27 is provided with three fitting recessed parts 70, 71 and 72 at positions corresponding to three projections 61, 62 and 63 of the output gear 51. In addition, the upper end face 68 of the valve body 27 is provided with a gear side cut-out part 73 which is formed by cutting a part in a circumferential direction of the valve body 27 from an upper side (final gear side) and from an outer peripheral side so that the gear side cut-out part 73 is communicated with the orifice 67. The gear side cut-out part 73 is provided with a flat bottom face 74 perpendicular to the axial line "L1" and an upper end opening 67a of the orifice 67 is exposed to the bottom face 74. In other words, the entire periphery of the upper end opening 67a is surrounded by the bottom face 74. In this embodiment, the orifice 67 is, as shown in FIG. 7, provided with a narrow hole part 75 whose inner diameter is constant and a diameter enlarging part 76 whose inner diameter dimension is enlarged from an upper end of the narrow hole part 75 to an upper side. The upper end of the diameter enlarging part 76 is the upper end opening 67a of the orifice 67.

A contact face 77 (lower end face) of the valve body 27 which is movable while contacting with the valve seat face 24 is formed with a recessed part 78 which is recessed to an upper side (final gear side) at a position corresponding to the orifice 67 around the axial line "L1". The lower end opening 67b of the orifice 67 is opened to the bottom face 78a of the recessed part 78. More specifically, a shape of the recessed part 78 is circular when viewed in the axial line "L1" direction and an inner diameter dimension of opening of the recessed part 78 is larger than an inner diameter dimension of the lower end opening 67b (orifice opening) of the orifice 67. The entire periphery of the lower end opening 67b is surrounded by the bottom face 78a. In this embodiment, an inner diameter dimension of the recessed part 78 is the same as an opening diameter dimension of the refrigerant outlet port 22 or is smaller than the opening diameter dimension of the refrigerant outlet port 22.

Further, the contact face 77 of the valve body 27 is provided with three valve seat face side cut-out parts 79, 80 and 81, which are formed by cutting out the valve body 27 from a lower side (valve seat face 24 side) and from an outer peripheral side, at positions different from the orifice 67 and the recessed part 78 in the circumferential direction. The valve seat face side cut-out parts 79, 80 and 81 are respectively separated from each other in a circumferential direction and three remaining parts 82, 83 and 84 are formed between adjacent valve seat face side cut-out parts 79, 80 and 81. The orifice 67 and the recessed part 78 are formed on an inner side of one remaining part 82 of three remaining parts 82, 83 and 84. In other words, the orifice 67 and the recessed part 78 are surrounded by the contact face 77 which is a lower end face of one remaining part 82 of the remaining parts 82, 83 and 84.

The valve seat face 24 of the valve seat constituting member 15 is provided with a size where the entire valve body 27 can be placed. Further, the refrigerant outlet port 22 which is formed in the valve seat constituting member 15 is provided at a position of the valve seat face 24 facing paths where the orifice 67, the recessed part 78 and the valve seat face side cut-out parts 79, 80 and 81 are moved when the valve body 27 is turned on the valve seat face 24 around the axial line "L1". In addition, the respective valve seat face side cut-out parts 79, 80 and 81 are formed in a size that the entire refrigerant outlet port 22 is capable of being exposed to the valve chamber 36 when the respective valve seat face side cut-out parts 79, 80 and 81 and the refrigerant outlet port 22 are overlapped with each other in the axial line "L1" direction by turning of the valve body 27. In other words, the valve seat face side cut-out parts 79, 80 and 81 are formed in a size so as to be capable of surrounding the refrigerant outlet port 22 when viewed in the axial line "L1" direction. Polishing is performed on the contact face 77 (lower end face of three remaining parts 82, 83 and 84) of the valve body 27 and the valve seat face 24 for enhancing flatness and surface roughness.

Three remaining parts 82, 83 and 84 are radially extended from a center portion of the valve body 27. In other words, three remaining parts 82, 83 and 84 are not extended only to one side with respect to the shaft insertion hole 66 which is located at the center of the valve body 27 but are extended to both sides across the shaft insertion hole 66. Further, each of the remaining parts 82, 83 and 84 is provided with a narrowed part whose width is narrowed on the way reaching the outer circumferential edge. In other words, each of the remaining parts 82, 83 and 84 is provided with a wide width part whose width in the circumferential direction is wide on the outer peripheral end portion.

As shown in FIGS. 5A and 5B and FIGS. 7 and 8, the output gear 51 is attached to the upper end face 68 of the valve body 27 by inserting the lower end portion of the shaft insertion part 56 into the insertion recessed part 69 of the valve body 27 and by inserting the respective projections 61, 62 and 63 into the fitting recessed parts 70, 71 and 72 of the valve body 27 and, as a result, the output gear 51 covers the valve body 27 from an upper side. In this embodiment, as shown in FIGS. 6A and 6B and FIG. 7, the fitting recessed part 72 among the fitting recessed parts 70, 71 and 72 formed on the upper end face 68 of the valve body 27 is formed as a through-hole which is penetrated to the valve seat face side cut-out part 81 among three valve seat face side cut-out parts 79, 80 and 81. Further, a tip end of the projection 63 of the output gear 51 inserted into the fitting recessed part 72 is extended into an inside of the valve seat face side cut-out part 81 and is caulked from the valve seat face 24 side. In other words, the tip end of the projection 63 is formed to be a caulked part. Therefore, the output gear 51 is fixed to the valve body 27 without looseness. In this manner, the output gear 51 and the valve body 27 are unified with each other and thus turning of the valve body 27 can be controlled by the stepping motor 40 with a high degree of accuracy.

The valve body 27 in this embodiment is an injection-molded article made of resin and the valve body 27 is provided with a gate mark 85 on the cut-off part 65 of the outer circumferential edge. Further, the fitting recessed part 72 and the orifice 67 are provided at positions separated from a straight line which connects the gate mark 85 with the center (axial line "L1") of the valve body 27. Therefore, a through-hole is not provided in the vicinity of a portion where a weld line is occurred to cause lowering of the strength and thus rigidity of the valve body 27 is secured.

(Control Operation of Refrigerant Flowing Amount)

When the stepping motor 40 is driven by the external control device, rotation of the stepping motor 40 is transmitted to the pinion 50 and the output gear 51. When the output gear 51 is turned, the valve body 27 is integrally turned with the output gear 51 around the support shaft 25 (axial line "L1") on the valve seat face 24.

In this case, as shown in FIG. 7, when the recessed part 78 formed on the valve seat face 24 side of the valve body 27 and the refrigerant outlet port 22 are overlapped with each other in the axial line "L1" direction, a first refrigerant flowing passage "A1" is formed in which the refrigerant inlet port 12 is communicated with the refrigerant outlet port 22 through the gear side cut-out part 73, the orifice 67 and the recessed part 78. In a state that the first refrigerant flowing passage "A1" is formed, a refrigerant flowing amount is controlled based on the cross-sectional area of the narrow hole part 75 of the orifice 67.

Further, as shown in FIG. 8, when the valve body 27 is integrally turned together with the output gear 51 and one of the valve seat face side cut-out parts 79, 80 and 81 is overlapped with at least a portion of the refrigerant outlet port 22 in a turning center line direction, a second refrigerant flowing passage "A2" is formed from the refrigerant inlet port 12 to the refrigerant outlet port 22 through the valve seat face side cut-out part 79, 80 or 81. In a state that the second refrigerant flowing passage "A2" is formed, a refrigerant flowing amount is controlled on the basis of an area of the refrigerant outlet port 22 overlapping with one of the valve seat face side cut-out parts 79, 80 and 81 in the axial line "L1" direction (opening area of the refrigerant outlet port 22). FIG. 8 shows a state that the valve seat face side cut-out part 80 and the entire refrigerant outlet 22 are overlapped with each other in the axial line "L1" direction.

Figure 9:
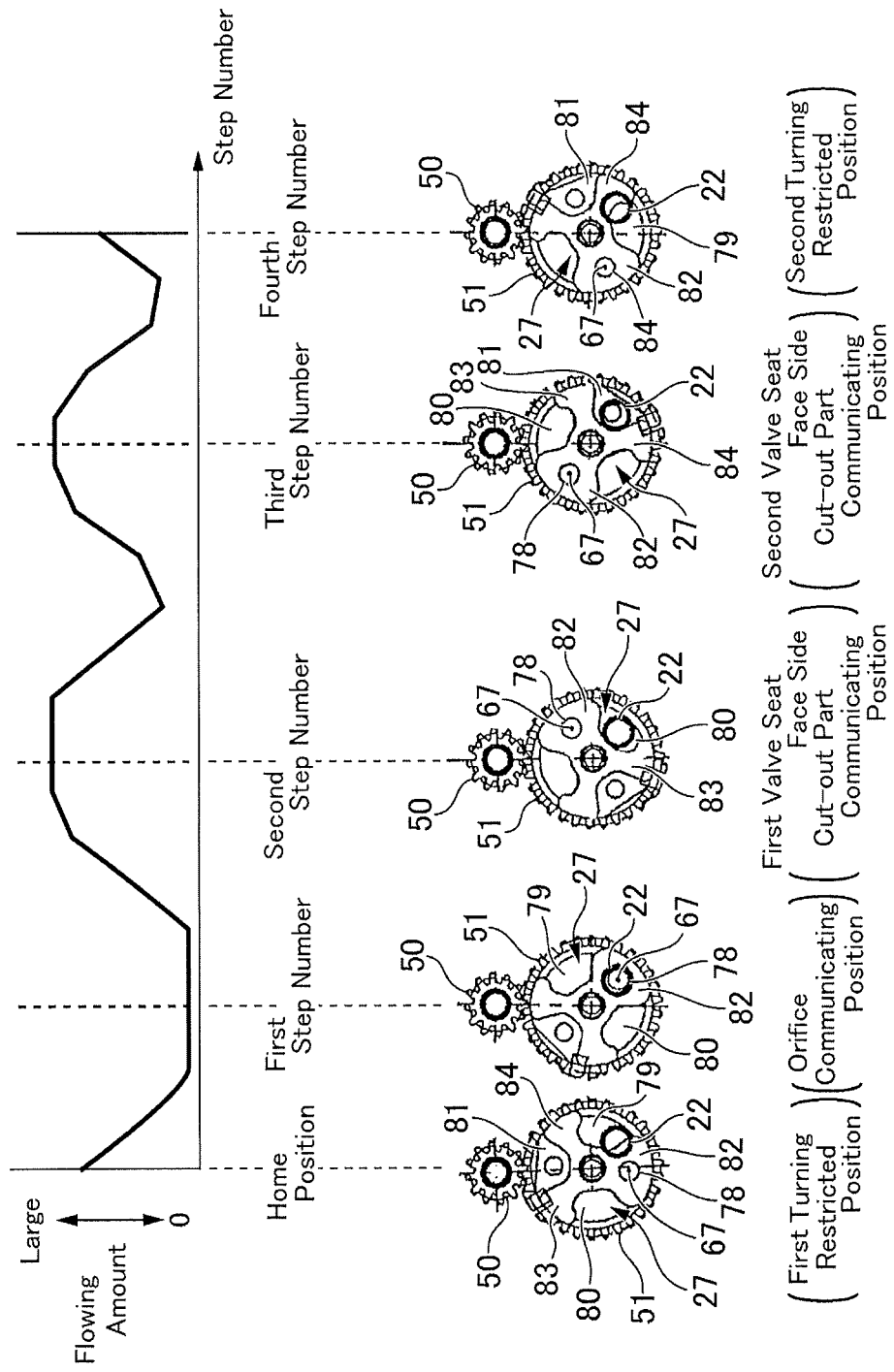
FIG. 9 is an explanatory view showing control operation for a refrigerant flowing amount.

FIG. 9 is an explanatory view showing control operation for a refrigerant flowing amount. A graph on an upper stage in FIG. 9 shows a refrigerant flowing amount which flows through the refrigerant valve device 1, and a vertical axis indicates a flow amount and a horizontal axis indicates a driving step number of the stepping motor 40 for driving the valve body 27 from a home position. The valve body 27 is driven from a home position in a CCW direction in FIG. 9 by driving the stepping motor 40. In this case, a rotating direction of the stepping motor 40 for driving the valve body 27 in a CCW direction in FIG. 9 is referred to as a forward rotating direction, and a rotating direction of the stepping motor 40 for operating in a CW direction is referred to as a reverse rotating direction. Views on a lower stage in FIG. 9 are explanatory views showing positional relationships between the valve body 27 and the refrigerant outlet port 22 when the stepping motor 40 is driven by predetermined steps in the forward rotating direction and the valve body 27 is viewed from a lower side. Control operation for a refrigerant flowing amount by the refrigerant valve device 1 will be described in detail below with reference to FIG. 9. In this embodiment, the valve body 27 is turned around the support shaft 25 by the valve body drive mechanism 52 within a set angular range over which the arm part 60 of the output gear 51 is not interfered with the pinion constituting member 54.

First, when the valve body 27 is located at a home position (first turning restricted position) around the support shaft 25, the arm part 60 of the output gear 51 is set in an abutted state with the abutted part 55 of the pinion constituting member 54 from one side around the axial line "L1". Therefore, turning of the valve body 27 located at the home position by driving the stepping motor 40 in the reverse rotating direction is restricted. The valve body 27 is disposed at a position where the valve seat face side cut-out part 79 and a portion of the refrigerant outlet port 22 are overlapped with each other in the axial line "L1" direction. In this state, the second refrigerant flowing passage "A2" is formed and a refrigerant flowing amount flowed by the refrigerant valve device 1 is determined by an area of an overlapped portion of the valve seat face side cut-out part 79 of the valve body 27 with the refrigerant outlet port 22 (opening area of the refrigerant outlet port 22).

When the stepping motor 40 is driven in a forward rotating direction from a state that the valve body 27 is located at the home position by a predetermined first step number, the valve body 27 is disposed at an angular position where the recessed part 78 and the refrigerant outlet port 22 are completely overlapped with each other in the axial line "L1" direction (orifice communicating position). This state is shown in FIG. 7 and the first refrigerant flowing passage "A1" is formed. A flowing amount of fluid flowing through the first refrigerant flowing passage "A1" is determined by a cross-sectional area of the narrow hole part 75 of the orifice 67.

In addition, when the stepping motor 40 is driven by predetermined steps in the forward rotating direction, in other words, when the stepping motor 40 is driven in the forward rotating direction from the state that the valve body 27 is located at the home position by a predetermined second step number, the valve body 27 is disposed at a position where the valve seat face side cut-out part 80 and the entire refrigerant outlet port 22 are overlapped with each other in the axial line "L1" direction (first valve seat face side cut-out part communicating position). This state is shown in FIG. 8. The second refrigerant flowing passage "A2" is formed and the refrigerant outlet port 22 is set in a fully opened state. A refrigerant flowing amount flowing through the second refrigerant flowing passage "A2" is determined by the entire opening area of the refrigerant outlet port 22.

After that, when the stepping motor 40 is driven by predetermined steps in the forward rotating direction, in other words, when the stepping motor 40 is driven in the forward rotating direction from the state that the valve body 27 is located at the home position by a predetermined third step number, the valve body 27 is disposed at a position where the valve seat face side cut-out part 81 and the entire refrigerant outlet port 22 are overlapped with each other in the axial line "L1" direction (second valve seat face side cut-out part communicating position). As a result, the second refrigerant flowing passage "A2" is formed again and the refrigerant outlet port 22 is set in a fully opened state. A refrigerant flowing amount flowing through the second refrigerant flowing passage "A2" is determined by the entire opening area of the refrigerant outlet port 22.

After that, when the stepping motor 40 is further driven by predetermined steps in the forward rotating direction, in other words, when the stepping motor 40 is driven in the forward rotating direction from the state that the valve body 27 is located at the home position by a predetermined fourth step number, the arm part 60 of the output gear 51 is abutted with the pinion constituting member 54 from the other side in the circumferential direction of the support shaft 25. As a result, the output gear 51 is restricted from turning due to rotation in the forward rotating direction of the stepping motor. In this case, the valve body 27 is disposed at a position where the valve seat face side cut-out part 79 and a portion of the refrigerant outlet port 22 are overlapped with each other in the axial line "L1" direction (second turning restricted position). In this state, the second refrigerant flowing passage "A2" is formed and a refrigerant flowing amount flowed by the refrigerant valve device 1 is determined by an area of an overlapped portion of the valve seat face side cut-out part 79 of the valve body 27 with the refrigerant outlet port 22 (opening area of the refrigerant outlet port 22).

When the refrigerant outlet port 22 is completely closed by the valve body 27, the valve body 27 is set in a pressed state against the valve seat face 24 by pressure of the refrigerant flowing into the valve chamber 36 from the refrigerant inlet port 12 and thus a large force is required as a driving force for driving the valve body 27. As a result, a large driving force is required in the stepping motor 40 as a drive source for driving the valve body 27. On the other hand, in the refrigerant valve device 1 in this embodiment, the refrigerant outlet port 22 is not set in a fully closed state by the valve body 27 while the valve body 27 is turned in the set angular range. In other words, while the valve body 27 is turned in the set angular range, the recessed part 78 and the refrigerant outlet port 22 are overlapped with each other in the axial line "L1" direction and, alternatively, at least a portion of the valve seat face side cut-out part 79, 80 or 81 and the refrigerant outlet port 22 are overlapped with each other in the axial line "L1" direction and thus, a refrigerant flowing amount does not become zero as shown by the graph on the upper stage in FIG. 9. As a result, a driving force for driving the valve body 27 can be made small and thus a small stepping motor 40 whose driving force is small can be used and electric power consumption is suppressed.

(Operations and Effects)

As described above, in the refrigerant valve device 1 to which at least an embodiment of the present invention is applied, the valve body drive mechanism 52 turns the valve body 27 and thereby, the refrigerant flowing passage from the refrigerant inlet port 12 to the refrigerant outlet port 22 through the valve chamber 36 is switched at least to the first refrigerant flowing passage "A1" whose flowing amount is small and to the second refrigerant flowing passage "A2" whose flowing amount is large. In other words, in the refrigerant inlet port 12 and the refrigerant outlet port 22, the refrigerant inlet port 12 (the other port) is set in a fully opened state even when the refrigerant flowing passage is switched to either of the first refrigerant flowing passage "A1" and the second refrigerant flowing passage "A2", and the valve body drive mechanism 52 turns the valve body 27 to switch the refrigerant flowing passage between the valve chamber 36 and refrigerant outlet port 22 (one port) to the first refrigerant flowing passage "A1" whose flowing amount is small and to the second refrigerant flowing passage "A2" whose flowing amount is large. Therefore, the flowing amount of refrigerant can be changed in one refrigerant outlet port 22.

Further, in the refrigerant inlet port 12 and the refrigerant outlet port 22, the refrigerant inlet port 12 is set in a fully opened state even when the refrigerant flowing passage is switched to either of the first refrigerant flowing passage "A1" and the second refrigerant flowing passage "A2" and thus an opening degree of the refrigerant inlet port 12 is not required to be changed by the valve body 27. Therefore, the valve body 27 can be disposed so as to turn around a position shifted to the refrigerant outlet port 22 and thus, in comparison with a case that the valve body 27 is turned at a middle position between the refrigerant inlet port 12 and the refrigerant outlet port 22, the size of the valve body 27 can be reduced. In other words, a distance between the axial line "L1" which is the turning center of the valve body 27 and the refrigerant outlet port is smaller than a distance between the axial line "L1" and the refrigerant inlet port. Further, in this embodiment, the refrigerant flowing passage between the valve chamber 36 and the refrigerant outlet port 22 (one port) is switched to the first refrigerant flowing passage "A1" whose flowing amount is small and to the second refrigerant flowing passage "A2" whose flowing amount is large. Therefore, pressure of the refrigerant acts as a force for pressing the valve body 27 against the valve seat face 24. Accordingly, unnecessary leakage of the refrigerant is hard to be occurred between the valve body 27 and the valve seat face 24.

Further, the valve body 27 is formed with the orifice 67 which is penetrated through the valve body 27 and whose one end is opened on the contact face 77 side. The valve body drive mechanism 52 switches the refrigerant flowing passage at least to the first refrigerant flowing passage "A1" through the orifice 67 and to the second refrigerant flowing passage "A2" in which the orifice 67 is not passed. Therefore, a flowing amount of the first refrigerant flowing passage "A1" can be set in an appropriate level by the inner diameter of the orifice 67. Further, the valve body 27 is formed with the valve seat face side cut-out parts 79, 80 and 81 (cut-out portion) for communicating the refrigerant outlet port 22 with the valve chamber 36 when the second refrigerant flowing passage is switched to the refrigerant flowing passage "A2". Therefore, a flowing amount of the second refrigerant flowing passage "A2" can be set in an appropriate level based on the sizes of the valve seat face side cut-out parts 79, 80 and 81.

Further, since the contact face 77 of the valve body 27 is polished, flowing of the refrigerant between the valve body 27 and the valve seat face 24 can be prevented. Further, the recessed part 78 is provided on the contact face 77 of the valve body 27 at a position corresponding to the orifice 67 and the lower end opening 67b of the orifice 67 (one end of the orifice 67) is opened in the bottom face 78a of the recessed part 78. Therefore, opening of the orifice 67 is prevented from being narrowed or closed by a burr occurred when the contact face 77 is polished.

Further, three remaining parts 82, 83 and 84 which function as the contact face 77 are radially extended from the axial line "L1" and thus, in a state that a plurality of the valve bodies 27 is fixed to a jig, when respective contact faces 77 of a plurality of the valve bodies 27 are simultaneously polished, polishing is easily performed on the contact faces 77 as the flat faces are perpendicular to the axial line "L1". Further, the valve seat face side cut-out parts 79, 80 and 81 (cut-out portion) divide the contact face 77 into a plurality of remaining parts 82, 83 and 84 in the circumferential direction on the moving trace (alternate long and short dash line "C0" in FIG. 6B) of the refrigerant outlet port 22 on the valve body 27 when the valve body 27 is turned. Further, on the turning trace, a width dimension in the circumferential direction of the contact face 77 (remaining part 84) between the valve seat face side cut-out parts 79 and 81 and a width dimension in the circumferential direction of the contact face 77 (remaining part 83) between the valve seat face side cut-out parts 80 and 81 are narrower than an opening width in the circumferential direction of the refrigerant outlet port 22. In this embodiment, a width dimension in the circumferential direction of the contact face 77 (remaining part 82) between the valve seat face side cut-out parts 79 and 80 is wider than the opening width in the circumferential direction of the refrigerant outlet port 22. However, the recessed part 78 is formed in the remaining part 82 and width dimensions in the circumferential direction of the contact face 77 between recessed part 78 and the valve seat face side cut-out parts 79 and 80 are narrower on the turning trace than the opening width in the circumferential direction of the refrigerant outlet port 22. Therefore, as described with reference to FIG. 9, the refrigerant outlet port 22 does not become a complete closed state and thus, the valve body 27 is prevented from being hard to move by pressure of the refrigerant. In other words, if the refrigerant outlet port 22 is completely closed, the valve body 27 is set in a pressed state against the valve seat face 24 by pressure of the refrigerant flowing into the valve chamber 36 from the refrigerant inlet port 12 and thus a large force is required as a drive force for driving the valve body 27. As a result, a large drive force is required in a drive source (stepping motor 40) for driving the valve body 27. However, according to this embodiment, this problem can be avoided.

Further, the output gear 51 (final gear) of the reduction gear train 53 is overlapped with the valve body 27 and is connected with the valve body 27 on an opposite side to the contact face 77 side of the valve body 27 (opposite side to the valve seat face 24) in the extended direction of the axial line "L1". Therefore, a structure surrounding the valve body 27 can be simplified and thus the size of the refrigerant valve device 1 can be reduced. Further, the connected portion of the output gear 51 with the valve body 27 is fitting portions of the projections 61, 62 and 63 to the fitting recessed parts 70, 71 and 72, and the connected portion is provided at plural positions in the circumferential direction. Therefore, the output gear 51 and the valve body 27 are surely connected with each other. In addition, the fitting recessed part 72 is formed as a through-hole penetrating to the valve seat face side cut-out part 81, and the tip end of the projection 63 fitted to the through-hole is extended to an inside of the valve seat face side cut-out part 81 and caulked from the valve seat face 24 side. Therefore, the output gear 51 can be fixed to the valve body 27 without looseness and thus the output gear 51 and the valve body 27 can be unified with each other. Accordingly, turning of the valve body 27 can be surely controlled by the valve body drive mechanism 52.

Further, the connected portions of the output gear 51 with the valve body 27 are provided at unequal intervals in the circumferential direction and thus a large space area can be secured between the fitting recessed part 70 and the fitting recessed part 71 (region where the orifice 67 is formed). Therefore, even when the upper end opening 67a of the orifice 67 (the other end of the orifice 67) of the valve body 27 is opened at a position overlapping with the output gear 51, a communicating path for communicating the other end of the orifice 37 with the valve chamber 36 can be easily formed on at least one of a face of the output gear 51 overlapping with the valve body 27 and a face of the valve body 27 overlapping with the output gear 51. For example, in a portion between the fitting recessed part 70 and the fitting recessed part 71 (portion where the other end of the orifice 67 is opened), the gear side cut-out part 73 (cut-out portion) can be formed as a communicating path on the face of the valve body 27 overlapping with the output gear 51. Therefore, even when the other end of the orifice 67 is opened in the valve body 27 at a position overlapping with the output gear 51, the first refrigerant flowing passage "A1" can be structured so as to pass the orifice 67 and the gear side cut-out part 73 (cut-out portion, communicating path).

In this embodiment, the communicating path (cut-out portion) may be formed on the face of the output gear 51 overlapping with the valve body 27. In this case, the first refrigerant flowing passage "A1" passes the cut-out part of the output gear 51, the orifice 67 and the recessed part 78. However, when a communicating path is formed on the face of the valve body 27 overlapping with the output gear 51, the output gear 51 and the valve body drive mechanism 52 are not necessary to be enlarged for providing a communicating path in the output gear 51. In other words, in a structure that a cut-out portion is provided on a portion on the valve body 27 side of the output gear 51 from an outer peripheral side, a teeth part of the output gear 51 is required to provide at a position separated from the valve body 27 in the axial line "L1" direction by an amount for providing the cut-out portion. Further, a gear and the like of a preceding stage of the reduction gear train 53 which is engaged with the output gear 51 are required to dispose at separated positions from the valve body 27 in the axial line "L" direction and therefore, the valve body drive mechanism 52 may be enlarged in the axial line "L" direction. On the other hand, when a communicating path is formed on the face of the valve body 27 overlapping with the output gear 51, the valve body drive mechanism 52 is not enlarged. Further, a diameter of the output gear 51 which is attached to the valve body 27 is not required to reduce and thus a stepping motor 40 whose drive force is small can be used as a drive source and turning of the valve body 27 can be controlled with a high degree of accuracy.

Further, since the valve body 27 is made of resin, the valve body 27 is easily formed. In addition, the gear side cut-out part 73 and the recessed part 78 are provided on both sides of the valve body 27 in the axial line "L1" direction at an angular position corresponding to the orifice 67 around the axial line "L1" and thus a pin of a die for forming the orifice 67 can be shortened and therefore, the strength of the pin is increased. Further, the orifice 67 is provided with the narrow hole part 75 and the diameter enlarging part 76. Therefore, in the pin of a die for forming the orifice 67, the strength of the pin can be increased by setting a thin pin portion for forming the narrow hole part 75 to be short and by setting a joining part of the portion of the pin for structuring the narrow hole part 75 with a portion structuring the diameter enlarging part 76 in an obtuse angle shape.

First Modified Embodiment of First Refrigerant Flowing Passage "A1"

FIGS. 10A and 10B are explanatory views showing a first modified embodiment of the first refrigerant flowing passage "A1" which is structured in a refrigerant valve device to which at least an embodiment of the present invention is applied. FIG. 10A is a perspective view showing a valve body 27 which is viewed from an upper side and FIG. 10B is a perspective view showing the valve body 27 which is viewed from a lower side. A basic structure of the valve body 27 shown in FIGS. 10A and 10B is similar to the valve body 27 which is described with reference to FIGS. 6A and 6B and the like, and thus the same reference signs are used in common portions and their descriptions are omitted.

The valve body 27 which is described with reference to FIGS. 6A and 6B and the like is formed with one orifice 67. However, in this embodiment, a recessed part 78, an orifice 67 and a gear side cut-out part 73 are formed at three positions in a circumferential direction. Therefore, the contact face 77 is formed with only one valve seat face side cut-out part 81 (cut-out portion).

According to the valve body 27 having a structure as described above, when one of three orifices 67 is overlapped with the refrigerant outlet port 22, a first refrigerant flowing passage "A1" is structured.

Figure 10:
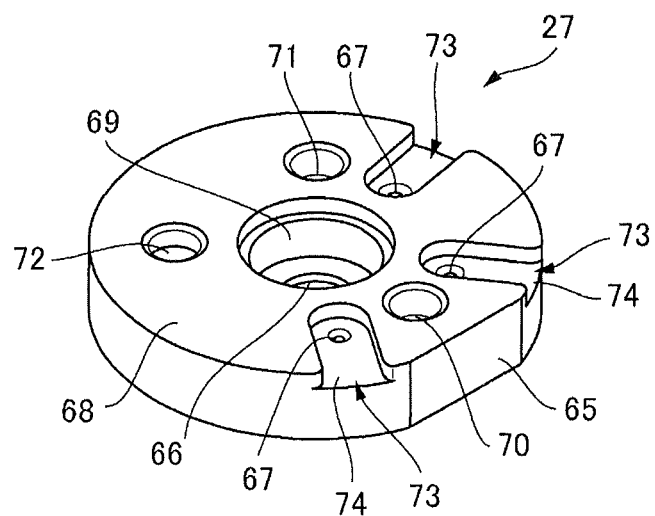
FIGS. 10A and 10B are explanatory views showing a first modified embodiment of a first refrigerant flowing passage which is structured in a refrigerant valve device to which at least an embodiment of the present invention is applied.
Figure 10:
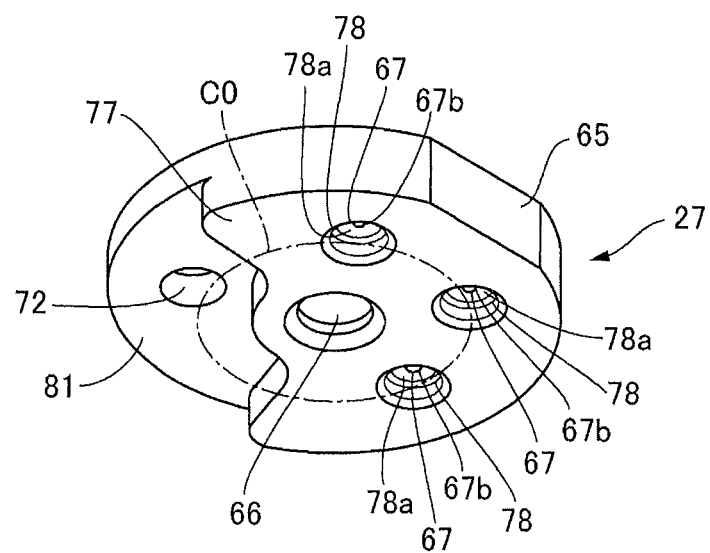

Further, in the valve body 27 in this embodiment, on a moving trace (alternate long and short dash line "C0" in FIG. 10(*b*)) of the refrigerant outlet port 22 on the valve body 27 when the valve body 27 is turned, width dimensions in a circumferential direction of the contact face 77 between the recessed parts 78 are narrower than an opening width in the circumferential direction of the refrigerant outlet port 22. Further, on the moving trace (alternate long and short dash line "C0" in FIG. 10(*b*)), width dimensions in the circumferential direction of the contact face 77 between the recessed parts 78 and the valve seat face side cut-out part 81 are narrower than the opening width in the circumferential direction of the refrigerant outlet 22. Therefore, as described with reference to FIG. 9, the refrigerant outlet port 22 does not become a complete closed state and thus, the valve body 27 is prevented from being hard to move by pressure of the refrigerant.

Second Modified Embodiment of First Refrigerant Flowing Passage "A1"

Figure 11:
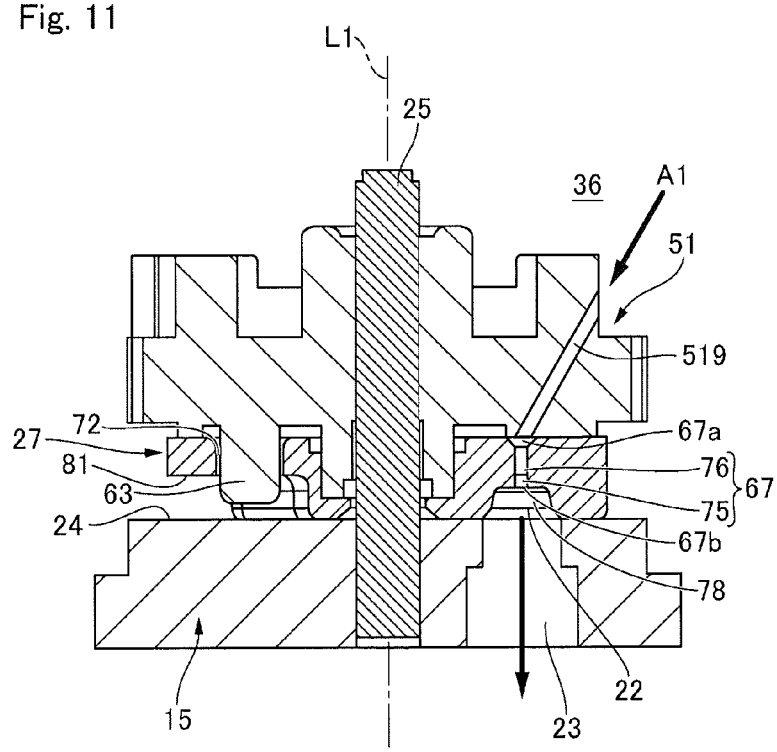
FIG. 11 is an explanatory view showing a second modified embodiment of a first refrigerant flowing passage which is structured in a refrigerant valve device to which at least an embodiment of the present invention is applied.

FIG. 11 is an explanatory view showing a second modified embodiment of the first refrigerant flowing passage "A1" which is structured in a refrigerant valve device to which at least an embodiment of the present invention is applied.

In a valve body 27 shown in FIG. 11, an upper end opening 67*a* of an orifice 67 (other end of the orifice 67) is opened at a position of the valve body 27 overlapping with the output gear 51. The output gear 51 is formed with a communicating path 519 for communicating the upper end opening 67*a* of the orifice 67 with the valve chamber 36. Therefore, when the orifice 67 is overlapped with the refrigerant outlet port 22, the first refrigerant flowing passage "A1" is structured through the orifice 67 and the communicating path 519.

Third Modified Embodiment of First Refrigerant Flowing Passage "A1"

Figure 12:
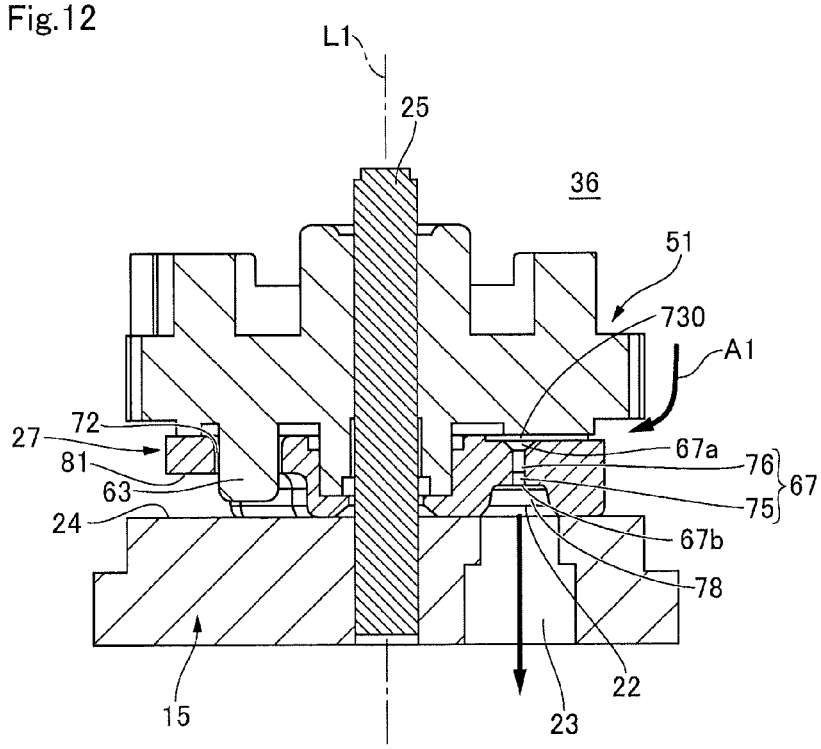
FIG. 12 is an explanatory view showing a third modified embodiment of a first refrigerant flowing passage which is structured in a refrigerant valve device to which at least an embodiment of the present invention is applied.

FIG. 12 is an explanatory view showing a third modified embodiment of a first refrigerant flowing passage "A1" which is structured in a refrigerant valve device to which at least an embodiment of the present invention is applied.

In a valve body 27 shown in FIG. 12, an upper end opening 67*a* of an orifice 67 (other end of the orifice 67) is opened at a position of the valve body 27 overlapping with the output gear 51. In this embodiment, a gap space 730 is provided between the output gear 51 and the valve body 27 and the upper end opening 67*a* of the orifice 67 is communicated with the valve chamber 36 through the gap space 730. More specifically, the gap space 730 is secured between an upper face 68 of the valve body and an under face 51*a* of the final gear 51. Therefore, when the orifice 67 is overlapped with the refrigerant outlet port 22, the first refrigerant flowing passage "A1" is structured through the orifice 67 and the gap space 730. The upper face 68 of the valve body may be formed over the entire periphery on an outer side of the upper end opening 67*a* of the orifice 67. Also in this case, when the orifice 67 is overlapped with the refrigerant outlet port 22, the first refrigerant flowing passage "A1" is structured through the orifice 67 and the gap space 730.

Fourth Modified Embodiment of First Refrigerant Flowing Passage "A1"

Figure 13:
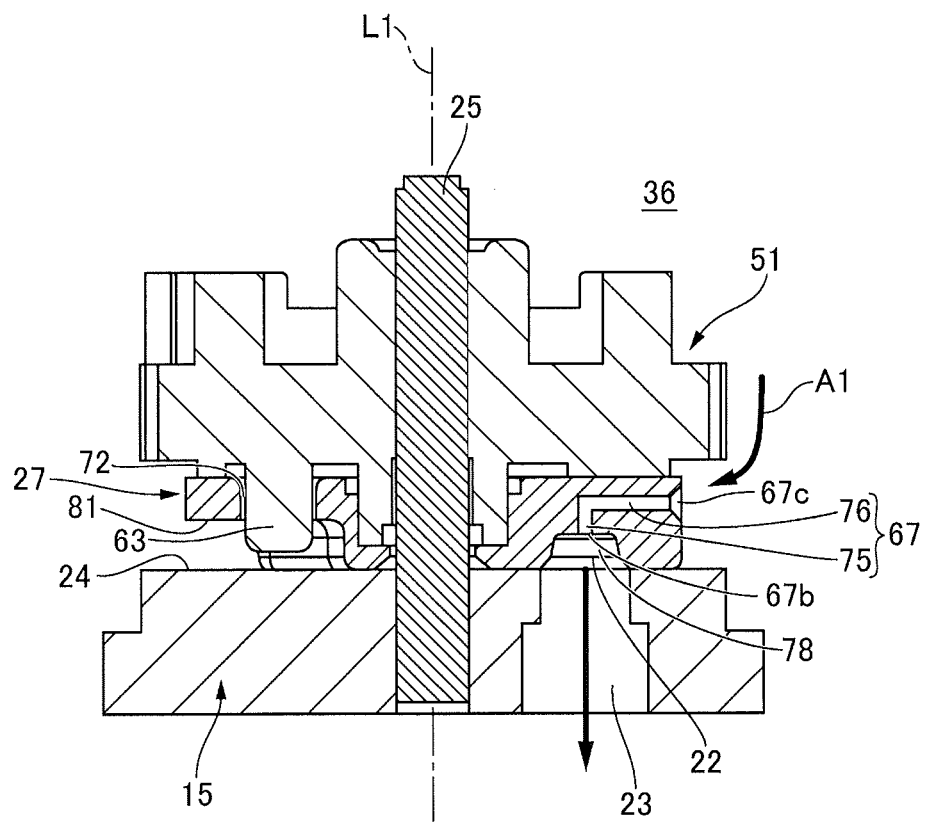
FIG. 13 is an explanatory view showing a fourth modified embodiment of a first refrigerant flowing passage which is structured in a refrigerant valve device to which at least an embodiment of the present invention is applied.

FIG. 13 is an explanatory view showing an orifice 67 of a valve body 27 which is used in another refrigerant valve device to which at least an embodiment of the present invention is applied.

In the valve body 27 which is described with reference to FIGS. 6A and 6B and the like, the orifice 67 is opened at a position overlapping with the output gear 51. However, in this embodiment, as shown in FIG. 13, the other end 67*c* of the orifice 67 is opened at a position of the valve body 27 where the other end 67*c* is not overlapped with the output gear 51 and is set in an opened state to the valve chamber 36. Therefore, even when the gear side cut-out part 73 (cut-out portion) described with reference to FIGS. 6A and 6B and the like is not formed, the orifice 67 and the valve chamber 36 are communicated with each other. In the embodiment shown in FIG. 13, the orifice 67 is formed to be bent on the way to an outer side in a radial direction. However, it may be structured that the orifice 67 is extended obliquely and the other end 67*c* of the orifice 67 is opened at a position of the valve body 27 where the other end 67*c* is not overlapped with the output gear 51 and is set in an opened state to the valve chamber 36.

Other Embodiments

In the embodiments described above, it is structured that, while the valve body 27 is turned within a predetermined angular range, the refrigerant outlet port 22 does not become a fully closed state by the valve body 27. However, it may be structured that the refrigerant valve device is provided with a fully closed state that the refrigerant outlet port 22 is fully closed by the contact face 77 of the valve body 27.

In the embodiments described above, the orifice 67 is formed in the valve body 27. However, it may be structured that a plurality of cut-out portions for connecting the refrigerant outlet port 22 with the valve chamber 36 is formed in a valve body 27 in which an orifice 67 is not formed, and that a first refrigerant flowing passage "A1" whose flowing amount is small and a second refrigerant flowing passage "A2" whose flowing amount is large are formed by the cut-out portions. For example, it may be structured that the valve seat face side cut-out parts 79, 80 and 81 shown in FIG. 6B are provided and an opening width of one of the valve seat face side cut-out parts 79, 80 and 81 is set to be narrower than other cut-out portions. According to this structure, when the cut-out portion whose opening width is narrow is overlapped with the refrigerant outlet port 22, the first refrigerant flowing passage "A1" whose flowing amount is small is structured and, when the cut-out portion whose opening width is wide is overlapped with the refrigerant outlet port 22, the second refrigerant flowing passage "A2" whose flowing amount is large is structured.

INDUSTRIAL APPLICABILITY

According to at least an embodiment of the present invention, the valve body is turned by the valve body drive mechanism and thereby the refrigerant flowing passage from the refrigerant inlet port to the refrigerant outlet port through the valve chamber can be switched at least to the first refrigerant flowing passage whose flowing amount is small and to the second refrigerant flowing passage whose flowing amount is large. Therefore, a flowing amount of the refrigerant can be changed in one refrigerant outlet port. Further, the valve body is turned around a position shifted to one port of the refrigerant inlet port and the refrigerant outlet port and thus the size of the valve body can be reduced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A refrigerant valve device comprising:
   a base which is provided with a refrigerant inlet port, a refrigerant outlet port and a valve seat face on which the refrigerant outlet port is opened;
   a cover structured to section a valve chamber communicating with the refrigerant inlet port and the refrigerant outlet port between the base and the cover;
   a valve body which is turnably disposed at a position as a turning center shifted to a side of the refrigerant outlet port in an inside of the valve chamber, the valve body being provided with a contact face sliding on the valve seat face; and
   a valve body drive mechanism structured to turn the valve body around an axial line which passes the turning center and is perpendicular to the valve seat face;
   wherein the valve body is provided with an orifice which penetrates through the valve body and whose one end is opened on a side of the contact face, the orifice structuring a first flowing passage from the refrigerant inlet port to the refrigerant outlet port, and a cut-out portion which is formed on the side of the contact face for directly communicating the valve chamber with the refrigerant outlet port, the cut-out portion structuring a second flowing passage;
   wherein the valve body drive mechanism is structured to turn the valve body so that a refrigerant flowing passage from the refrigerant inlet port to the refrigerant outlet port through the valve chamber is switched at least to the first flowing passage through the orifice or to the second flowing passage through the cut-out portion; and
   wherein a refrigerant flowing amount in the first flowing passage is smaller than a refrigerant flowing amount in the second flowing passage.

2. The refrigerant valve device according to claim 1, wherein
   the refrigerant inlet port is always set in a fully opened state.

3. The refrigerant valve device according to claim 1, wherein the orifice is provided at plurality of positions of the valve body.

4. The refrigerant valve device according to claim 1, wherein
   the cut-out portion divides the contact face into a plurality of portions in a circumferential direction on a moving trace of the one port on the valve body when the valve body is turned, and
   a width dimension in the circumferential direction of the contact face on a turning trace is narrower than an opening width in the circumferential direction of the one port.

5. The refrigerant valve device according to claim 4, wherein
   the contact face is provided with a recessed part,
   one end of the orifice is opened at a bottom part of the recessed part, and
   a width dimension in the circumferential direction on the turning trace of the contact face between the recessed part and the cut-out portion in the circumferential direction is narrower than the opening width in the circumferential direction of the one port.

6. The refrigerant valve device according to claim 1, wherein the contact face is provided with a recessed part and one end of the orifice is opened at a bottom part of the recessed part.

7. The refrigerant valve device according to claim 1, wherein
   the drive mechanism comprises a drive source and a gear train structured to transmit a drive force of the drive source to the valve body, and
   a final gear of the gear train is overlapped with the valve body on an opposite side to a side of the contact face of the valve body in an extended direction of the axial line and is connected with the valve body.

8. The refrigerant valve device according to claim 7, wherein a connected portion of the final gear with the valve body is provided at plural positions.

9. The refrigerant valve device according to claim 8, wherein the connected portions of the final gear with the valve body are provided at unequal intervals in the circumferential direction.

10. The refrigerant valve device according to claim 7, wherein
the other end of the orifice is opened at a position of the valve body overlapping with the final gear, and
a communicating path for communicating the other end of the orifice with the valve chamber is provided on at least one of a face of the final gear overlapping with the valve body and a face of the valve body overlapping with the final gear.

11. The refrigerant valve device according to claim 10, wherein the communicating path is a cut-out portion which is provided on the face of the valve body overlapping with the final gear.

12. The refrigerant valve device according to claim 7, wherein
the other end of the orifice is opened at a position of the valve body overlapping with the final gear, and
the final gear is provided with a communicating path for communicating the other end of the orifice with the valve chamber.

13. The refrigerant valve device according to claim 7, wherein the other end of the orifice is opened at a position of the valve body overlapping with the final gear and is communicated with the valve chamber through a gap space formed between the valve body and the final gear.

14. The refrigerant valve device according to claim 7, wherein the other end of the orifice is opened at a position of the valve body that is not overlapped with the final gear so as to be in an opened state to the valve chamber.

15. The refrigerant valve device according to claim 1, wherein the valve body is provided with a plurality of cut-out portions structured to connect the one port with the valve chamber.

16. The refrigerant valve device according to claim 15, wherein
the cut-out portions divide the contact face into a plurality of portions in a circumferential direction on a moving trace of the one port on the valve body when the valve body is turned, and
a width dimension in the circumferential direction of the contact face on a turning trace is narrower than an opening width in the circumferential direction of the one port.

17. The refrigerant valve device according to claim 16, wherein
the drive mechanism comprises a drive source and a gear train structured to transmit a drive force of the drive source to the valve body, and
a final gear of the gear train is overlapped with the valve body on an opposite side to a side of the contact face of the valve body in an extended direction of the axial line and is connected with the valve body.

18. The refrigerant valve device according to claim 17, wherein a connected portion of the final gear with the valve body is provided at plural positions.

19. The refrigerant valve device according to claim 1, wherein
the drive mechanism comprises a drive source and a gear train which transmits a drive force of the drive source to the valve body, and
a final gear of the gear train is overlapped with the valve body on an opposite side to a side of the contact face of the valve body in an extended direction of the axial line and is connected with the valve body.

20. The refrigerant valve device according to claim 19, wherein a connected portion of the final gear with the valve body is provided at plural positions.

21. The refrigerant valve device according to claim 1, wherein at least one of the contact face and the valve seat face is polished.

* * * * *